(12) United States Patent
Bergmann et al.

(10) Patent No.: US 11,557,945 B2
(45) Date of Patent: Jan. 17, 2023

(54) ELECTROTECHNICAL COIL, METHOD FOR PRODUCING SAME, AND ELECTROMAGNET OR ELECTRIC MACHINE COMPRISING AT LEAST ONE SUCH COIL

(71) Applicant: FRAUNHOFER-GESELLSCHAFT ZUR FOERDERUNG DER ANGEWANDTEN FORSCHUNG E.V., Munich (DE)

(72) Inventors: Markus Bergmann, Lichtenstein (DE); Mirko Bach, Chemnitz (DE); Michael Heuser, Bremen (DE); Markus Werner, Chemnitz (DE); Maik Linnemann, Chemnitz (DE); Franz-Joseph Woestmann, Muenster (DE)

(73) Assignee: FRAUNHOFER-GESELLSCHAFT ZUR FOERDERUNG DER ANGEWANDTEN FORSCHUNG E.V., Munich (DE)

( * ) Notice: Subject to any disclaimer, the term of this patent is extended or adjusted under 35 U.S.C. 154(b) by 562 days.

(21) Appl. No.: 16/499,242

(22) PCT Filed: Mar. 28, 2018

(86) PCT No.: PCT/EP2018/000134
§ 371 (c)(1),
(2) Date: Sep. 28, 2019

(87) PCT Pub. No.: WO2018/177596
PCT Pub. Date: Oct. 4, 2018

(65) Prior Publication Data
US 2020/0028416 A1    Jan. 23, 2020

(30) Foreign Application Priority Data

Mar. 31, 2017 (DE) ..................... 10 2017 205 544.8

(51) Int. Cl.
*H01F 7/06* (2006.01)
*H02K 15/04* (2006.01)
(Continued)

(52) U.S. Cl.
CPC ............. *H02K 15/045* (2013.01); *B22C 9/02* (2013.01); *B22C 9/22* (2013.01); *H01F 41/064* (2016.01);
(Continued)

(58) Field of Classification Search
CPC . B22C 9/02; B22C 9/22; H01F 41/064; H01F 41/077; H01F 41/12; H01F 41/04; H02K 15/04; H02K 15/045; H02K 3/04
See application file for complete search history.

(56) References Cited

U.S. PATENT DOCUMENTS

2010/0039197 A1    2/2010   Cheng
2019/0333697 A1*  10/2019   Werner ................ H01F 41/061
2020/0028416 A1    1/2020   Bergmann et al.

FOREIGN PATENT DOCUMENTS

DE    102012212637 A1    1/2014
DE    102014000636 A1    7/2015
(Continued)

OTHER PUBLICATIONS

Canadian Intellectual Property Office, Office Action Issued in Application No. 3,054,745, dated Aug. 5, 2021, 3 pages.
(Continued)

*Primary Examiner* — Paul D Kim
(74) *Attorney, Agent, or Firm* — McCoy Russell LLP

(57) ABSTRACT

The invention relates to an electrotechnical coil, to a method for producing same, and to an electromagnet or an electric machine comprising at least one such coil. The aim of the
(Continued)

invention is to produce and use an electrotechnical coil for achieving an increased slot fill factor reliably and easily in a reproducible and economical manner. This is achieved in that the method according to the invention has the steps: step A: casting an electrotechnical coil with at least one winding which runs about a coil axis; and step B: shaping the coil, thereby changing the cross-section Q, Q' of the at least one winding, such that the centroid FS, FS' of the cross-section Q, Q' of the at least one winding is displaced at least partly in the radial direction R relative to the coil axis A.

11 Claims, 1 Drawing Sheet

(51) Int. Cl.
  *H01F 41/064* (2016.01)
  *H01F 41/077* (2016.01)
  *B22C 9/02* (2006.01)
  *B22C 9/22* (2006.01)
  *H01F 41/12* (2006.01)
  *H02K 3/04* (2006.01)

(52) U.S. Cl.
  CPC ........... *H01F 41/077* (2016.01); *H01F 41/12* (2013.01); *H02K 3/04* (2013.01)

(56) References Cited

FOREIGN PATENT DOCUMENTS

| | | | |
|---|---|---|---|
| DE | 102014222468 | A1 | 5/2016 |
| EP | 2387135 | A2 | 11/2011 |
| EP | 2688183 | A2 | 1/2014 |
| EP | 3602584 | B1 | 3/2021 |
| JP | 2005310566 | A | 11/2005 |
| JP | 2015002614 | A | 1/2015 |
| JP | 2015009259 | A2 | 1/2015 |
| WO | 2014111179 | A2 | 7/2014 |
| WO | 2018177596 | A1 | 10/2018 |

OTHER PUBLICATIONS

Intellectual Property Office of India, Examination Report Issued in Application No. 201917038717, dated Jul. 9, 2020, 6 pages.
ISA European Patent Office, International Search Report Issued in Application No. PCT/EP2018/000134, dated Jul. 27, 2018, WIPO, 6 pages.
Korean Intellectual Property Office, Notice of Preliminary Rejection Issued in Application No. 10-2019-7028777, dated Aug. 4, 2020, 11 pages.
National Intellectual Property Administration of the People's Republic of China, Office Action and Search Report Issued in Application No. 201880022189.0, dated Oct. 12, 2020, 11 pages. (Submitted with Partial Translation).
Japanese Patent Office, Notice of Reasons for Rejection Issued in Application No. 2019-545752, dated Oct. 13, 2020, 15 pages.

* cited by examiner

ELECTROTECHNICAL COIL, METHOD FOR PRODUCING SAME, AND ELECTROMAGNET OR ELECTRIC MACHINE COMPRISING AT LEAST ONE SUCH COIL

The present application is a U.S. National Phase of International Application No. PCT/EP2018/000134, entitled "ELECTROTECHNICAL COIL, METHOD FOR PRODUCING SAME, AND ELECTROMAGNET OR ELECTRIC MACHINE COMPRISING AT LEAST ONE SUCH COIL", and filed on Mar. 28, 2018. International Application No. PCT/EP2018/000134 claims priority to German Application No. 10 2017 205 544.8, filed on Mar. 31, 2017. The entire contents of each of the above-listed applications are hereby incorporated by reference for all purposes.

The present invention relates to an electrotechnical coil, to a method for producing same, and to an electromagnet or an electric machine comprising at least one such coil. In particular, the present invention relates to the shaping calibration of electrotechnical coils produced by casting technology and consisting of current-conducting materials with demolding chamfers in a combined method.

Until now, coils have often been wound from wire (round profile, rectangular profile), which, due to the conductor shape, leads to insufficient use of space (groove filling factor), especially with conically designed coils. A major geometric limitation in the prior art lies in the limited possibilities for the use of different winding cross-sections: even with optimum utilization, the use of round wires for the windings leaves an unusable gap between the individual windings. The necessary insulation, the wire introduction and the discrete distribution of the conductors also limit the filling factor. Since the groove filling factor ultimately achieved can only be estimated suitably for the electromagnetic design and cannot be calculated due to ignorance of the actual variant of the motor later on, the motors tend to become (too) heavy and (too) large due to the higher masses required (copper of the windings and sheet metal packages of the stator and rotor).

In comparison to wound coils with round wire or rectangular wire, coils produced by casting technology enable an enormous increase in the groove filling factor due to the high geometrical freedom of design. In addition, the geometry of the casting coils shows a significantly improved heat dissipation behavior.

A method for producing an electrotechnical coil using casting technology is known from EP 2 387 135 A2.

According to EP 2 387 135 A2, the achievable torque density of permanently excited synchronous machines with tooth coil winding depends significantly on the ratio of total copper cross-sectional area to groove area, the so-called groove filling factor. Increasing the filling factor at a constant torque allows a flatter stator design or a widening of the teeth to relieve the magnetic circuit.

Up to now, casting coils have been produced by casting technology in a precision casting process using lost injected wax models and lost molds. The injection tools have been kept as small as possible by way of elaborate molding concepts. However, this led to a considerable increase in the cost of designing the casting tools and made the process susceptible to malfunctions. Due to the production process, however, gaps between the windings must be provided on castings for demolding. In cast coils, these lead to a reduction in the groove filling factor and have a negative effect on heat dissipation.

In summary, it can be stated that with today's common methods of producing coil windings there are technical and economic limits of groove filling with individual windings. A groove filling factor of 70% is already a very good value; the technically and economically feasible limits are currently approx. 75% to 80% (Source: Müller, Vogt, Ponick "Berechnung elektrischer Maschinen", p. 168, 6th edition, Wiley-VCH, Weinheim, 2008."). Furthermore, the gaps between the windings required for demolding and the surface quality of the coils produced by casting technology lead to a reduction in the groove filling factor and considerable problems with the subsequent insulation.

Based on the prior art, it is the object of the present invention to produce and apply an electrotechnical coil for achieving an increased groove filling factor in a reliable and simple, reproducible and economical way.

The object of the present invention is achieved by the method according to claim 1, the electrotechnical coil according to claim 9 and the electromagnet or the electric machine according to claim 10.

The method according to the invention for producing an electrotechnical coil according to claim 1 comprises the steps:

Step A: casting an electrotechnical coil with at least one winding which runs about a coil axis;

Step B: shaping the coil, thereby changing the cross-section of the at least one winding, such that the center of area of the cross-section of the at least one winding is displaced at least partly in the radial direction relative to the coil axis.

The method according to the invention uses the advantages of shaping production and achieves little or no loss of material. In concrete terms, the coil produced in step A by casting technology can be provided with large-angled demolding chamfers for easier demolding, because the demolding chamfers can be reduced or completely eliminated in the downstream step B for plastic shaping of the coil by shifting the center of area of the cross-section of the windings in the radial direction. The coil is thereby compressed along the coil axis and the windings of the coil are pressed together so that the coil material is displaced in the radial direction and the center of area of the cross-section of the windings is shifted at least partially in the radial direction with respect to the coil axis. A shift of the center of area is also possible partly in axial direction. Demolding chamfers at large angles simplify the removal from the casting mold. When economical mass production processes such as die casting are used, demolding chamfers of at least 1.5° should be provided, which can also be smaller for short demolding paths. Preferably, the coil is brought into the final contour (calibrated) during the shaping process. This is accompanied by the simplification of primary-forming process chains such as casting by the omission of preparation, production and processing steps. Furthermore, the surface quality can be adjusted subsequently by the shaping process, which reduces the quality requirements for the casting process and increases the process robustness.

Advantageous developments of the invention are subject matters of the sub-claims.

It can be advantageous if step A comprises at least one of the following sub-steps:

Step A1: providing a preferably reusable negative mold, preferably by embedding a positive model in an embedding medium, for example of sand or of metallic material, wherein the positive model is particularly preferably removed again after an impression in the embedding medium or remains as a lost mold in the embedding medium. The reusability of the negative mold reduces the production efforts in terms of time and costs.

Step A2: casting the coil material into the negative mold, preferably supported by gravitation and/or pressure, preferably when the negative mold is subjected to negative pressure and/or in a protective gas atmosphere, particularly preferably in precision casting, centrifugal casting, vacuum casting or low-pressure casting. Due to these measures the inclusion of pores or particles in the cast coil material can be reduced or even prevented altogether.

Step A3: curing the cast coil material in the negative mold. Curing is preferably carried out by (passive) cooling of the negative mold and the coil material contained therein.

Step A4: removing the coil from the negative mold. For this purpose the negative mold is preferably made in multiple parts and can be opened.

Step A5: cleaning the coil. In this step it is possible to remove residues of an existing embedding medium.

Step A6: Soft annealing the coil. This measure can facilitate shaping and possibly calibrating of the coil in the downstream step B.

Step A7: Electrically insulating the at least one winding of the coil, preferably by immersing the coil in insulation varnish (e.g. in the CVD or PVD process) or by coating or sheathing it with an insulation layer. Owing to this step the individual windings of the coil are electrically separated from one another.

The sequence of the sub-steps is preferably as indicated, but can also be changed in any way as long as the method is technically feasible with the changed sequence of sub-steps.

However, it may also be useful if step B comprises at least one of the following sub-steps:

Step B1: providing a multi-part shaping tool which, in a composite state, forms a cavity for receiving the coil, wherein the cavity is preferably matched to the inner contour and/or the outer contour of the coil, wherein preferably a (conical and/or rotationally symmetric) punch forms an upper part of the shaping tool and/or a (conical and/or rotationally symmetric) die forms a lower part of the shaping tool.

Step B2: arranging the coil in the shaping tool, preferably in such a way that the coil bears radially on the inside and/or radially on the outside against the shaping tool, wherein preferably the coil bears radially on the inside against the punch and/or bears radially on the outside against the die.

Step B3: moving at least two parts of the multi-part shaping tool relative to one another along the coil axis while reducing the volume of the cavity, wherein preferably the punch enters the die along the coil axis.

Step B4: shaping the coil by compressing the coil along the coil axis, wherein preferably the windings of the coil are pressed against one another starting radially on the inside, so that the coil material is displaced outwards in the radial direction with respect to the coil axis, preferably in such a way that the gaps between the windings are reduced or eliminated.

Step B5: changing the cross-section of the at least one winding, preferably during step B4, so that an angle which the upper side and/or the lower side of the cross-section encloses with a plane intersecting the coil axis perpendicularly changes and/or decreases by at least 1°, 1.5°, 2°, 2.5°, 3°, 4° or 5° with respect to the non-deformed state.

Step B6: cutting off a sprue of the coil.

Step B7: forming at least one connection region for an electrical contacting of the coil, preferably by embossing.

Step B8: calibrating the coil to final contour, wherein preferably the shaping tool calibrates the coil radially on the inside and/or radially on the outside and/or at the upper and/or lower axial end with respect to the coil axis, wherein particularly preferably the punch calibrates the coil radially on the inside and/or at the upper axial end and/or the die calibrates the coil radially on the outside and/or at the lower axial end.

Step B9: electrically insulating the at least one winding of the coil, preferably by immersing the coil in insulation varnish (e.g. in the CVD or PVD process) or by coating or by sheathing it with an insulation layer.

The sequence of the sub-steps is preferably as indicated, but can also be changed in any desired way as long as the method with the changed sequence of sub-steps is technically feasible.

The optional measures suggested according to steps B1 to B9 can be conducive to the shaping and calibrating of the coil while eliminating surface irregularities and compaction of the coil material.

It may be useful when the cross-section of the at least one winding of the coil cast in step A tapers inwards or outwards in the radial direction with respect to the coil axis, wherein the cross-section of the at least one winding of the coil cast in step A is preferably polygonal and/or conical and/or trapezoidal, preferably isosceles polygonal and/or conical and/or trapezoidal. With this design, demolding chamfers may be provided while the subsequent shaping in step B is additionally promoted.

It may turn out to be advantageous when the angle which the upper side and/or lower side of the cross-section of the at least one winding of the coil cast in step A encloses with a plane intersecting the coil axis perpendicularly is at least 1°, 1.5°, 2°, 2.5°, 3°, 4° or 5°. Such demolding chamfers promote the use of economical mass production processes such as for instance die casting.

However, it can also be practical if the inner contour and/or the outer contour of the coil obtained after step A and/or after step B corresponds/correspond to the lateral surface of a cylinder, cuboid, truncated cone or truncated pyramid. Coils with such inner and/or outer contours are useable in a particularly advantageous manner in connection with electromagnets and electric machines, in particular rotary-current synchronous machines in corresponding stator grooves.

It may be useful when the electrotechnical coil in step B is shaped so as to occupy at least 95% of the volume of a body having the same inner and outer contour. In this variant it is possible to achieve a high torque density when the coil is used in the field of electric machines.

It may be of advantage when the center of area of the cross-section of the at least one winding is displaced in step B in the radial direction inwards or outwards with respect to the coil axis. This displacement of coil material advantageously serves to reduce or eliminate demolding chamfers and thus to increase the groove filling factor or the torque density achievable with the coil.

A further aspect of the present invention relates to an electrotechnical coil, produced according to the method according to one of the preceding variants.

A further aspect of the present invention relates to an electromagnet or an electric machine, preferably a synchronous machine, preferably a rotary-current synchronous machine, with at least one coil according to the preceding variant.

Further advantageous developments of the present invention follow from any combinations of the features disclosed in the claims, figures and the description.

Terms and Definitions

Electrotechnical Coil

In the context of the present invention, a coil is understood to be a component of electrical engineering: Coils according to the invention are thus suitable for any applications in electrical engineering, for example in electrical machine construction, especially in the construction of electric motors and electric generators. Coils according to the invention are also referred to as electrotechnical coils in the following.

Such coils are one of the most important components of electrical engineering. They perform a wide range of functions in electric circuits and electromechanical applications. In the field of electrical engineering, coils are an essential functional component of the motor. Depending on the class and design of the motor, the coils have different geometries, winding shapes and winding numbers.

The radius and/or the pitch and/or the cross-sectional shape and/or the cross-sectional area of the at least one winding of the coil is preferably constant over at least a middle section between the axial end sections of the coil or over the entire coil. The number of windings is arbitrarily selectable.

The coil is preferably made of a castable, electrically conductive material such as aluminum, silver, copper or an alloy.

The coil is preferably straight, convex, concave, conical, rotationally symmetric or non-rotationally symmetric.

The electrotechnical coil is produced for example according to the method described in EP 2 387 135 A2, in particular according to the method according to one of claims 1 to 6 of EP 2 387 135 A2, or is an electrotechnical coil described in EP 2 387 135 A2, in particular an electrotechnical coil according to one of claims 7 to 12 of EP 2 387 135 A2.

Shaping

The term shaping is to be understood as plastic shaping unless something else is explicitly mentioned.

Calibration

The term "calibration" refers to the shape of the coil in final contour, unless something else is explicitly mentioned. The calibration step preferably includes compacting the cast and cured coil material and/or smoothing surface irregularities and/or separating the sprue in one process step.

Coil Axis

The coil axis is preferably the longitudinal axis of the coil or the axis around which the at least one winding of the coil unwinds and is preferably a straight line.

Cross-Section

The sectional view representing the cross-section of the at least one winding is preferably in a plane enclosing the coil axis, unless explicitly stated otherwise.

Center of Area

The center of area of the cross-sectional shape of the extruded profile is the geometric center of gravity of this cross-sectional shape. Mathematically, this corresponds to the averaging of all points within the cross-sectional shape. In simple cases, the center of area can be obtained by geometric considerations, or generally calculated by integration using mathematical methods. The methods of analytical geometry are used to describe the bodies.

Winding Axis

The winding axis preferably corresponds to the center of the maximum outer dimensions of the cross-section of the at least one winding or the center of the smallest rectangle into which the cross-section of the at least one winding fits. In the case of a rectangular cross-sectional shape, the center of area coincides with the winding axis. In the case of a triangular or trapezoidal cross-section, the center of area is offset starting from the winding axis each time in the direction of the wider side of the cross-section. The (imaginary) winding axis winds helically around the (imaginary) coil axis.

Demolding Chamfer

For production reasons, it is advantageous to have demolding chamfers on cast parts. The type and size of the demolding chamfers depend on the casting process selected. In cast coils, these lead to a reduction in the groove filling factor and have a negative effect on heat dissipation. The demolding chamfer corresponds to the angle which the upper side and/or the lower side of the cross-section of a winding of the coil cast in step A encloses with a plane intersecting the coil axis perpendicularly.

DETAILED DESCRIPTION

The preferred embodiment of the present invention is described in detail below using the attached figures. The person skilled in the art understands that the features described in connection with the embodiment do not have to be realized in their entirety in order to realize the claimed invention, but can also be realized independently of each other in other configurations. In particular, some of the features described in the embodiment may be omitted or other features may be added.

In preparation for the casting of the coil 1 in step A, the final geometry of the electrotechnical coil 1 is designed, for example using CAD. Depending on the concrete application, the number, radius, pitch, cross-sectional shape and cross-sectional area of the windings of the coil are determined and the coil geometry is defined in the installation state depending on the available installation space. It goes without saying that the number, radii, pitch, cross-sectional shape and cross-sectional area of the windings of the coil can be changed at will, as long as this does not contradict the teaching claimed. The described embodiment refers to a method for the production of an electrotechnical coil 1 with four windings running around the coil axis A.

On the basis of the final geometry, the casting geometry of the electrotechnical coil 1 is designed with simulated reversal of the shaping process carried out in step B and in consideration of demolding chamfers and material shrinkage. The distance between the windings of the coil 1 is defined by the feasible shaping degree, the technical casting requirements and the type of insulation application.

In step A1 of the production process, a reusable negative mold is provided. For this purpose, a positive model is embedded in an embedding medium such as sand or metallic material or bulk material, the positive model being removed again after leaving its imprint in the embedding medium or remaining as a lost mold in the embedding medium.

The casting of the coil material into the negative mold in step A2 is carried out supported by gravitation and preferably pressure, e.g. under a protective gas atmosphere, while the negative mold may be subjected to negative pressure. The coil 1 according to the invention can be produced in particular in precision casting, centrifugal casting, vacuum casting or low-pressure casting.

After curing of the cast coil material in the negative mold (step A3), the cured and cooled coil 1 is removed from the negative mold (step A4), freed of any residues of the embedding medium and cleaned (step A5) and, if necessary, soft annealed in preparation for the subsequent shaping in step B (step A6).

The electrical insulation of the windings of the coil 1 (step A7) can optionally be carried out before or after the coil 1 has been shaped in step B and is achieved, for example, by immersing the coil 1 in insulation varnish, e.g. in the CVD or PVD process, or by coating or sheathing it with an insulation layer.

Figure 1:
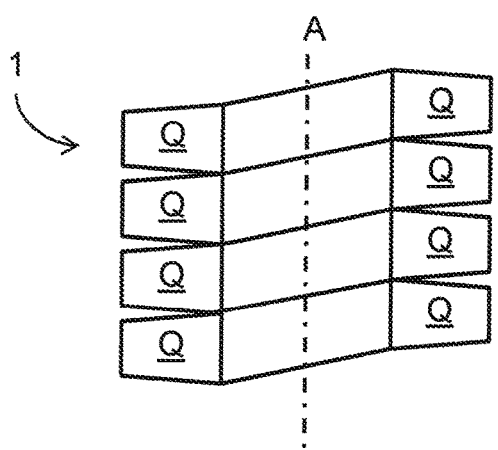
FIG. 1 shows a schematic sectional view of a cast and cured electrotechnical coil with four windings and constant pitch, the cross-sections of the windings tapering outwards in the radial direction with respect to the coil axis and being in the form of isosceles trapezes.

A schematic sectional view of an exemplary electrotechnical coil 1, which was produced in casting technology in the sequence of steps A1 to A7/A8, is shown in FIG. 1. The sectional view shown there runs along the coil axis A or in a plane which encloses the coil axis A. In the view shown in FIG. 1, the coil 1 comprises a cylindrical inner and outer contour and a total of four windings with a constant cross-sectional shape, wherein the pitch or distance of the windings from each other along the coil axis A is reduced to a minimum in conformity with the technical casting possibilities. The cross-section Q of each winding tapers outwards in the radial direction with respect to the coil axis A and is in the form of an isosceles trapeze, the parallel base sides of which are aligned parallel to the coil axis A and the inner angles of which respectively have the same size on the same parallel base side.

Figure 5:
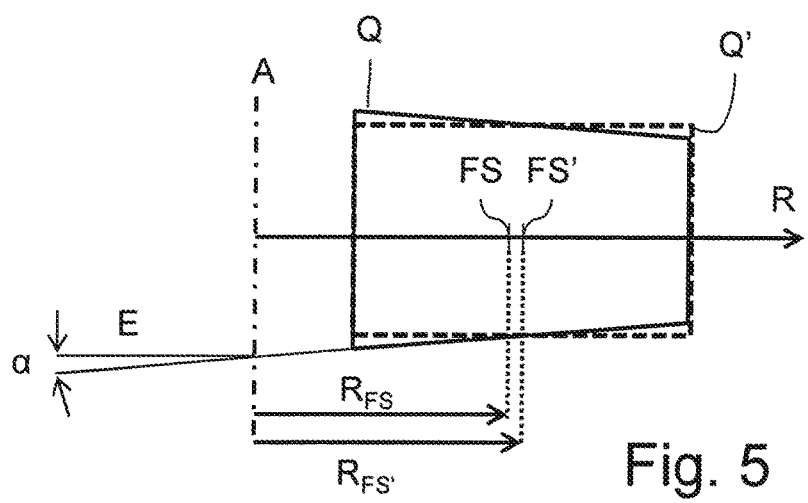
FIG. 5 shows, in a schematic view, the change in the cross-section of the winding caused by shaping the coil, starting from the shape of an isosceles trapeze (continuous contour line) into a rectangular shape (dashed contour line), as well as the associated displacement of the center of area of the cross-section of the winding in the radial direction outwards with respect to the coil axis.

FIG. 5 shows in a continuous contour line the cross-sectional shape Q of a winding of the coil 1 before the shaping process carried out in step B. For example, the angle α which the upper side and the lower side of the cross section Q of the winding of the coil 1 cast in step A enclose with a plane E intersecting the coil axis A perpendicularly is for instance 1.5° and corresponds to the demolding chamfers of the winding. With respect to a winding axis that defines the center of the smallest rectangle into which the cross-section Q of the winding fits, the center of area FS of the non-deformed cross-section Q of the winding is offset radially inwards in the direction of the coil axis A.

The shaping carried out in step B changes the cross-section Q' of the windings of the coil 1 in such a way that the center of area FS' of the changed cross-section Q' is displaced with respect to the coil axis A in radial direction relative to the center of area FS of the unchanged cross-section Q.

Figure 2:
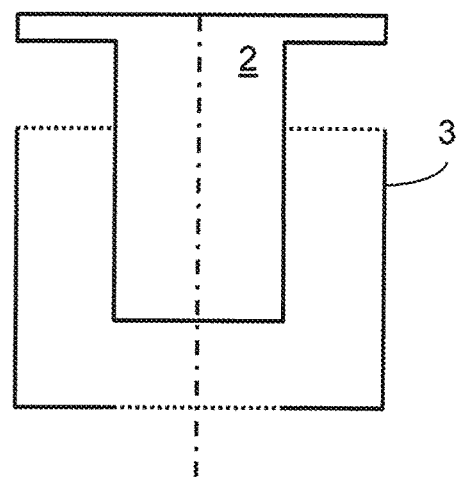
FIG. 2 shows a schematic view of a two-part press tool with a rotationally symmetric punch as upper part and a rotationally symmetric die as lower part.

In step B1, a two-part shaping tool 2, 3 shown schematically in FIG. 2 with a rotationally symmetric punch 2 as upper part and a rotationally symmetric die 3 as lower part is provided for this purpose. The punch 2 and the die 3 in an assembled state form a cavity matched to the inner and outer contours of the coil 1 for receiving the coil 1.

When the coil 1 is arranged in the cavity of the shaping tool 2, 3 (step B2), the punch 2 is located radially on the inside and the die 3 is located radially on the outside on the coil 1. This condition is shown schematically in FIG. 3.

Figure 3:
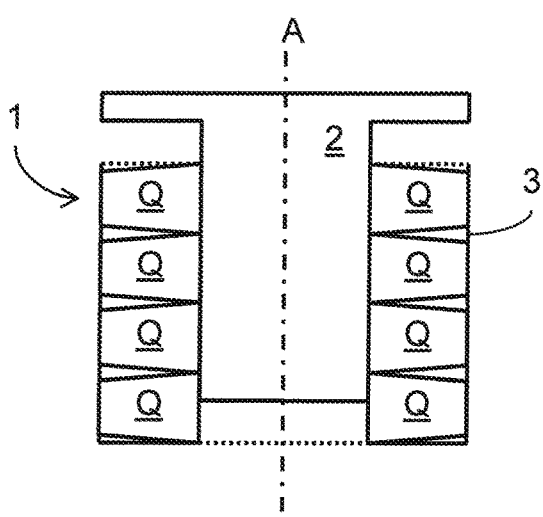
FIG. 3 shows a schematic view of an electrotechnical coil arranged in the press tool and supported radially on the inside and radially on the outside by the press tool in the state prior to shaping, the pitch of the coil being neglected for representation purposes.
Figure 4:
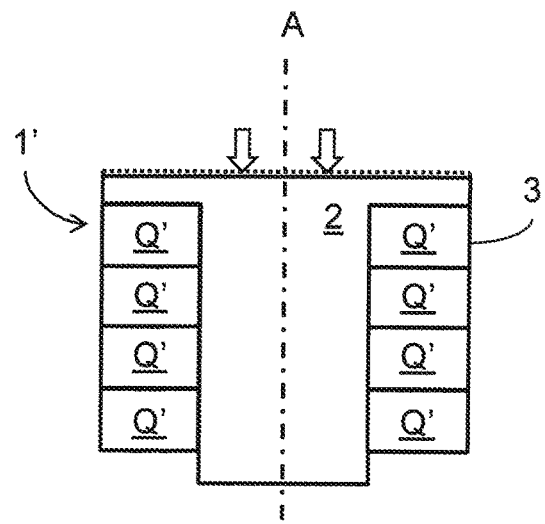
FIG. 4 shows a schematic view of the electrotechnical coil arranged in the press tool and supported radially on the inside and radially on the outside in the state after shaping, the cross-sections of the windings being designed to be substantially rectangular and the pitch of the coil being neglected for representation purposes.

Starting from the schematic state shown in FIG. 3, the punch 2 is moved along the coil axis A in step B3, thereby reducing the volume of the cavity, and enters the die 3.

The plastic shaping of the coil 1 is carried out in steps B4 and B5 by compressing the coil 1 along the coil axis A. The punch 2 immerses from above into the die 3 and flattens the conical areas of the windings of the coil 1. The windings of the coil 1 are pressed against each other starting radially on the inside, so that the coil material is displaced outwards in the radial direction R with respect to the coil axis A until the gaps between the windings are reduced or eliminated. During the shaping process, the cross-section Q, Q' of the windings is changed so that the angle α which the upper and lower sides of the cross-section Q, Q' respectively enclose with a plane E intersecting the coil axis A perpendicularly is reduced to 0° or reduced by 1.5 compared to the non-deformed state. This change in the cross-section Q, Q' of the winding causes the center of area FS, FS' of the cross-section Q, Q' to be shifted in the radial direction R with respect to the coil axis A. The $R_{FS'}$ radius of the center of area FS' after shaping is greater than the $R_{FS}$ radius of the center of area FS before shaping. The deformed cross-section Q' of the winding of the coil 1 after step B is shown in FIG. 5 in a dashed line. The shaping carried out in step B compresses the coil 1 in such a way that it occupies at least 95% of the volume of a body with the same inner and outer contour.

In the course of shaping, for example, a sprue of the coil 1 can be cut off in a step B6 and/or a connection area for electrical contacting of the coil 1 can for instance be formed by embossing in a step B7.

In step B8, for example, the coil 1 is calibrated to the final contour by the punch 2 forming the coil 1 radially on the inside and at the upper axial end into the final contour, while the die 3 forms the coil 1 radially on the outside and at the lower axial end into the final contour. During calibration, surface irregularities are smoothed out.

If not already carried out before, the electrical insulation of the windings of the coil 1 is carried out in step B9.

The effects and advantages of the invention can be summarized as follows:

The most important advantage is the economic efficiency of manufacturing shaping coils with low use of production equipment. In addition, there are the following advantages:

The use of reusable tools is possible during the technical casting production of the preform since rather large demolding chamfers can be used This result in maximum productivity due to continuous production sequence Improvement of the surface quality for subsequent coating Reduction of residual porosities in the casting coil Increasing the groove filling factor Additional improvement of the heat dissipation path Reduction of the minimum possible winding thickness compared to casting the coil in final contour Setting of narrow geometric tolerances High process stability Combination with other process steps such as cutting off the sprue system Combination with embossing/forming processes of the connection areas for electrical contacting The invention also applies to coated materials, where a subsequent insulation step is not necessary.

The preform is produced by primary forming. By using ground samples (destructive material testing) on winding cross-sections, it can be proven whether a coil or its preform has been produced by shaping.

Proof of the technical casting production of the preform can be established on the basis of distinctive and always occurring defects (pores, oxides, possibly also quenching structure on the surface) in the casting structure.

The field of application of the invention regards coils for electric motors which are mass-produced. Since electric drives and generators show a steadily increasing sales volume and a constantly increasing penetration of the different industries, all areas of automotive engineering, mechanical engineering, shipping, aviation as well as consumer areas are included.

LIST OF REFERENCE SIGNS 1 coil
2 punch
3 die
angle between upper/lower side of the cross-section and plane perpendicular to the coil axis
A coil axis
E plane perpendicular to the coil axis
FS center of area (before shaping)
FS' center of area (after shaping)
Q cross-section of the winding (before shaping)
Q' cross section of the winding (after shaping)
R radial direction
$R_{FS}$ radius of the center of area (before shaping)
$R_{FS'}$ radius of the center of area (after shaping)

The invention claimed is:

1. A method for producing an electrotechnical coil, comprising the following steps:
    Step A: casting a coil with at least one winding which runs about a coil axis;
    Step B: shaping the coil, thereby changing a cross-section of the at least one winding, such that a center of area of the cross-section of the at least one winding is displaced at least partly in a radial direction relative to the coil axis.

2. The method according to claim 1, wherein Step A comprises at least one of the following sub-steps:
    Step A1: providing a reusable negative mold, by embedding a positive model in an embedding medium;
    Step A2: casting a coil material into the negative mold, preferably supported by a gravitation and/or pressure, preferably when the negative mold is subjected to negative pressure and/or in a protective gas atmosphere, particularly preferably in precision casting, centrifugal casting, vacuum casting or low-pressure casting;
    Step A3: curing the cast coil material in the negative mold to form the coil;
    Step A4: removing the coil from the negative mold;
    Step A5: cleaning the coil;
    Step A6: soft annealing the coil; and
    Step A7: electrically insulating the at least one winding of the coil, by immersing the coil in insulation varnish or by coating or sheathing the coil with an insulation layer.

3. The method according to claim 2, wherein the embedding medium is sand or of metallic material, and wherein the positive model is removed again after an impression in the embedding medium or remains as a lost mold in the embedding medium.

4. The method according to claim 1, wherein Step B comprises at least one of the following sub-steps:
    Step B1: providing a multi-part shaping tool which, in a composite state, forms a cavity for receiving the coil, wherein the cavity is matched to an inner contour and/or an outer contour of the coil, wherein a punch forms an upper part of the shaping tool and/or a die forms a lower part of the shaping tool;
    Step B2: arranging the coil in the shaping tool in such a way that the coil bears radially on an inside and/or radially on an outside against the shaping tool, wherein the coil bears radially on an inside against the punch and/or bears radially on an outside against the die;
    Step B3: moving at least two parts of the multi-part shaping tool relative to one another along the coil axis while reducing a volume of the cavity, wherein the punch enters the die along the coil axis;
    Step B4: shaping the coil by compressing the coil along the coil axis, wherein windings of the coil are pressed against one another starting radially on the inside, so that the coil material is displaced outwards in the radial direction with respect to the coil axis;
    Step B5: changing the cross-section of the at least one winding so that an angle which the upper side and/or the lower side of the cross-section encloses with a plane intersecting the coil axis perpendicularly changes and/or decreases by between 1° and 5° with respect to a non-deformed state;
    Step B6: cutting off a sprue of the coil;
    Step B7: forming at least one connection region for an electrical contacting of the coil by embossing;
    Step B8: calibrating the coil to a final contour, wherein the shaping tool calibrates the coil radially on the inside and/or radially on the outside and/or at the upper and/or lower axial end with respect to the coil axis, wherein the punch calibrates the coil radially on the inside and/or at the upper axial end and/or the die calibrates the coil radially on the outside and/or at the lower axial end; and
    Step B9: electrically insulating the at least one winding of the coil by immersing the coil in an insulation varnish or by coating or by sheathing the coil with an insulation layer.

5. The method according to claim 4, wherein the cross-section of the at least one winding of the coil cast in Step A tapers inwards or outwards in the radial direction with respect to the coil axis.

6. The method according to claim 5, wherein the cross-section of the at least one winding of the coil cast in Step A is isosceles polygonal and/or conical and/or trapezoidal.

7. The method according to claim 4, wherein the inner contour and/or the outer contour of the coil obtained after Step A and/or after Step B corresponds/correspond to a lateral surface of a cylinder, cuboid, truncated cone or truncated pyramid.

8. The method according to claim 4, wherein the center of area of the cross-section of the at least one winding is displaced in Step B in the radial direction inwards or outwards with respect to the coil axis.

9. The method according to claim 4, wherein the coil material is displaced so that gaps between the windings of the coil are reduced or eliminated, and wherein Step B5 occurs during Step B4.

10. The method according to claim 1, wherein an angle which an upper side and/or a lower side of the cross-section of the at least one winding of the coil cast in Step A encloses with a plane intersecting the coil axis perpendicularly is between 1° and 5°.

11. The method according to claim 1, wherein the electrotechnical coil is shaped in Step B so as to occupy at least 95% of a volume of a body having the same inner and outer contour.

* * * * *